(12) United States Patent
Grase et al.

(10) Patent No.: US 10,822,070 B2
(45) Date of Patent: Nov. 3, 2020

(54) PRESSURE BULKHEAD SYSTEM

(71) Applicant: Airbus Operations GmbH, Hamburg (DE)

(72) Inventors: Karim Grase, Hamburg (DE); Marc Schimmler, Hamburg (DE); Wolfgang Eilken, Hamburg (DE); Memis Tiryaki, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 423 days.

(21) Appl. No.: 15/590,699

(22) Filed: May 9, 2017

(65) Prior Publication Data

US 2017/0327199 A1 Nov. 16, 2017

(30) Foreign Application Priority Data

May 13, 2016 (EP) .................................... 16169574

(51) Int. Cl.
| | | |
|---|---|---|
| *B64C 1/10* | (2006.01) | |
| *B64C 1/06* | (2006.01) | |
| *B64C 1/12* | (2006.01) | |
| *B64C 1/00* | (2006.01) | |
| *B64D 9/00* | (2006.01) | |

(52) U.S. Cl.
CPC ............... *B64C 1/10* (2013.01); *B64C 1/068* (2013.01); *B64C 1/061* (2013.01); *B64C 1/12* (2013.01); *B64C 2001/009* (2013.01); *B64D 9/00* (2013.01)

(58) Field of Classification Search
CPC .. B64C 1/10; B64C 1/12; B64C 1/061; B64C 1/068; B64C 2001/009; B64C 2001/0072

USPC ......................................................... 244/119
See application file for complete search history.

(56) References Cited

U.S. PATENT DOCUMENTS

| | | |
|---|---|---|
| 5,934,616 A | 8/1999 | Reimers et al. |
| 6,378,805 B1 | 4/2002 | Stephan et al. |
| 6,443,392 B2 | 9/2002 | Weber et al. |
| 8,596,578 B2 | 12/2013 | Noebel et al. |
| 2010/0243806 A1* | 9/2010 | Vera Villares ............ B64C 1/10 244/119 |

(Continued)

OTHER PUBLICATIONS

German Office Action, dated Dec. 5, 2017, priority document.
European Search Report, dated Nov. 7, 2016, priority document.

*Primary Examiner* — Timothy D Collins
*Assistant Examiner* — Terri L Filosi
(74) *Attorney, Agent, or Firm* — Greer, Burns & Crain, Ltd.

(57) ABSTRACT

A pressure bulkhead system comprises a pressure bulkhead adapted to be connected to a fuselage of a vehicle to separate a pressurized cabin space of the vehicle from an unpressurized cabin space of the vehicle, and a peripheral pressure frame to sealingly connect the pressure bulkhead to the vehicle fuselage. The peripheral pressure frame comprises an attachment section sealingly attached to an outer rim portion of a first surface of the pressure bulkhead. The first surface, when the pressure bulkhead system is installed in the vehicle, faces the unpressurized cabin space of the vehicle. A flange section is adapted to be sealingly attached to an inner surface of the vehicle fuselage and extends in a direction facing away from the first surface of the pressure bulkhead. A flexible section interconnects the attachment section and the flange section and is flexible to accommodate cabin pressure acting on the pressure bulkhead.

14 Claims, 3 Drawing Sheets

(56) References Cited

U.S. PATENT DOCUMENTS

2015/0083862 A1    3/2015  Grase et al.
2015/0203185 A1*   7/2015  Rosman .................... B64C 1/12
                                                      244/131

* cited by examiner

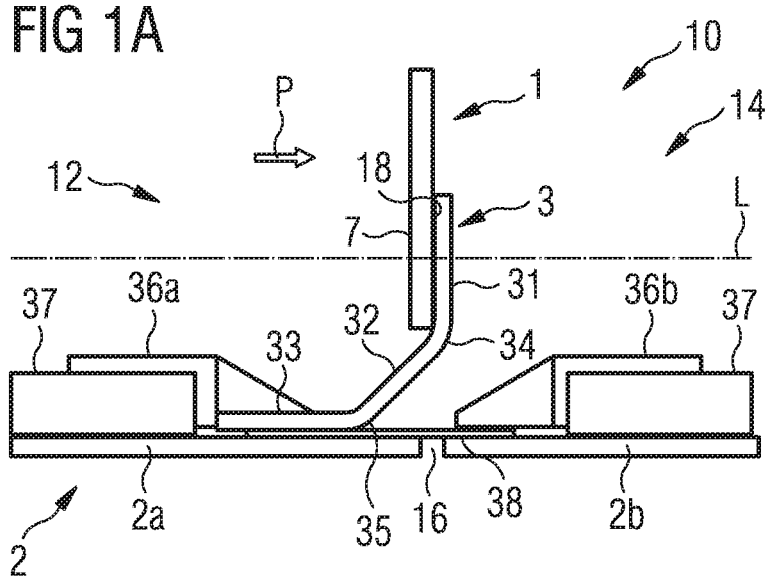
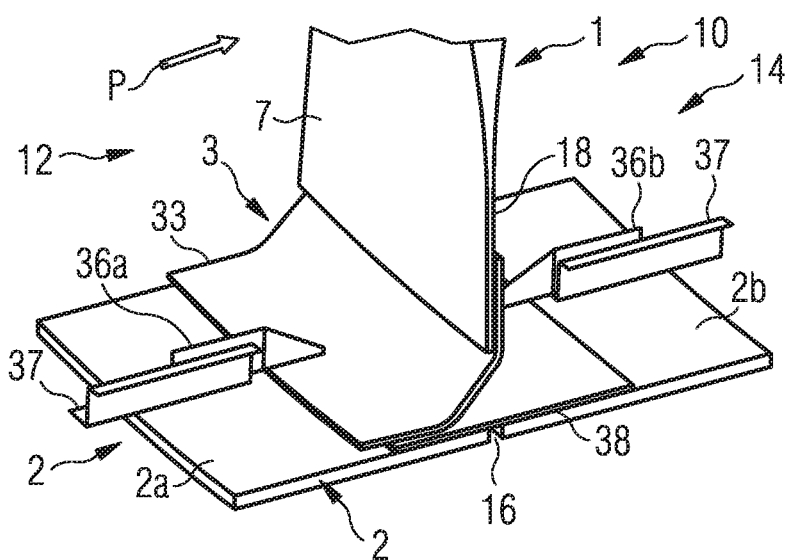
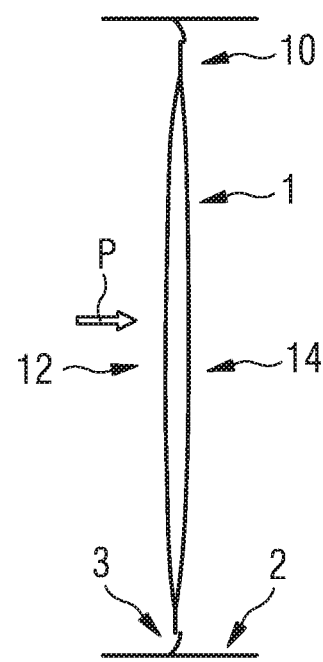

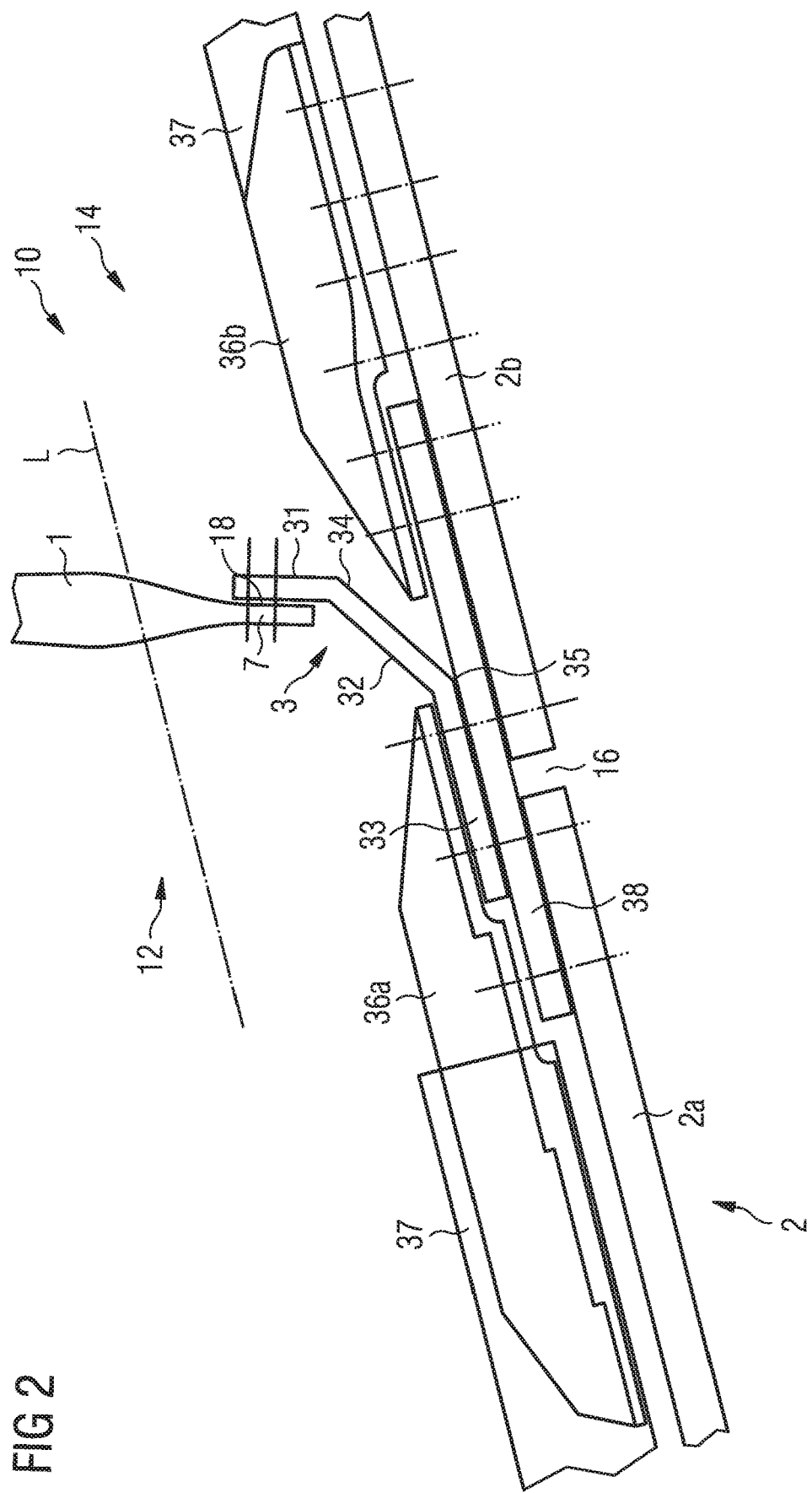

PRESSURE BULKHEAD SYSTEM

CROSS-REFERENCES TO RELATED APPLICATIONS

This application claims the benefit of the European patent application No. 16 169 574.7 filed on May 13, 2016, the entire disclosures of which are incorporated herein by way of reference.

BACKGROUND OF THE INVENTION

The present invention relates to a pressure bulkhead system for installation in a vehicle, in particular an aircraft, in order to separate a pressurized cabin space from an unpressurized cabin space. Further, the invention relates to a vehicle, in particular an aircraft, which is equipped with a pressure bulkhead system of this kind, and a method for mounting a pressure bulkhead system of this kind in a vehicle, in particular an aircraft.

Aircraft with pressurized cabins have front and rear pressure bulkheads arranged near the front and rear of the fuselage, respectively. The pressure bulkheads typically have some degree of flexibility so they can deform to accommodate pressure changes within the cabin. Most pressure bulkheads are designed in the shape of a dome with a curved skin. This has the advantage that the skin is loaded solely as a membrane, as a result of which the skin can be designed to be very thin. In particular in pressure bulkheads made of fiber-reinforced composite materials, such as carbon-fiber reinforced polymer, the skin can be built up from a very few laminate layers, as a result of which the weight of the pressure bulkhead can be low. However, the dome shape takes up valuable space within the cabin.

Pressure bulkheads which are flat, rather than dome-shaped, are also known, for example from U.S. Pat. No. 8,596,578 B2, a prior art document which discloses a substantially flat rear or aft pressure bulkhead which is made of a monolithic carbon fiber-reinforced composite. According to U.S. Pat. No. 8,596,578 B2, a flat bulkhead is attached to a fuselage by a rigid peripheral pressure frame having a web connected to a peripheral edge surface section of the bulkhead. The web of the peripheral pressure frame extends approximately centrally from an outer flange at its foot and opens out at its head into an inner flange which is oriented in the opposite direction to the flight direction. Fuselage barrels which are spaced apart from one another by a gap are connected with one another via the outer flange of the pressure frame, wherein the web is arranged in the region of the axial gap.

SUMMARY OF THE INVENTION

The invention is directed to an object of providing a pressure bulkhead system comprising a peripheral pressure frame for sealingly connecting a pressure bulkhead to a fuselage of a vehicle in order to separate a pressurized cabin space from an unpressurized cabin space of the vehicle, wherein the peripheral pressure frame is capable of deforming, to a certain extent, in response to a cabin pressure load acting on the pressure bulkhead and to thus reduce the stresses acting on the peripheral pressure frame and, in particular, to a connection of the peripheral pressure frame to a structural component of the vehicle. Further, the invention is directed to an object of providing a vehicle which is equipped with a pressure bulkhead system of this kind, and a method for mounting a pressure bulkhead system of this kind in a vehicle.

A pressure bulkhead system comprises a pressure bulkhead which is adapted to be connected to a fuselage of a vehicle in order to separate a pressurized cabin space of the vehicle from an unpressurized cabin space of the vehicle, in particular in a direction of a longitudinal axis of the vehicle fuselage. The pressure bulkhead system is suitable for installation in any kind of vehicle, for example a ship or an aircraft, which comprises cabin spaces held under different pressures, resulting in a differential pressure acting on the pressure bulkhead separating the cabin spaces. In the context of the present application, the terms "pressurized cabin space" and "unpressurized cabin space" thus should not be understood so as to be limited to cabin spaces that are either artificially pressurized or not. Instead, the terms "pressurized cabin space" and "unpressurized cabin space" should also encompass arrangements wherein, for whatever reason, a higher pressure prevails in the "pressurized cabin space" than in the "unpressurized cabin space." In particular, in case the pressure bulkhead system is intended for installation in an aircraft, the pressure bulkhead of the pressure bulkhead system may be a rear bulkhead or a forward bulkhead.

The pressure bulkhead system further comprises a peripheral pressure frame for sealingly connecting the pressure bulkhead to the fuselage of the vehicle. Thus, the peripheral pressure frame serves to establish a sealing connection between the pressure bulkhead and an inner surface of the vehicle fuselage.

The peripheral pressure frame comprises an attachment section which is sealingly attached to an outer rim portion of a first surface of the pressure bulkhead. The first surface is a surface of the pressure bulkhead, which, when the pressure bulkhead system is installed in the vehicle, faces the unpressurized cabin space of the vehicle. Hence, when the pressure bulkhead system is installed in the vehicle, the first surface faces away from a pressure load acting on the pressure bulkhead, i.e., on a second surface of the pressure bulkhead which faces the pressurized cabin space of the vehicle, due to the differential pressure existing between the pressurized cabin space and the unpressurized cabin space. In a preferred embodiment of the pressure bulkhead system, the attachment section of the peripheral pressure frame is substantially ring-shaped and, in a circumferential direction of the pressure bulkhead, extends along the entire outer rim portion of the first surface of the pressure bulkhead in order to provide for a particularly secure connection between the peripheral pressure frame and the pressure bulkhead.

The peripheral pressure frame further comprises a flange section which is adapted to be sealingly attached to an inner surface of the vehicle fuselage and which extends in a direction facing away from the first surface of the pressure bulkhead. In other words, the flange section of the peripheral pressure frame is adapted to be sealingly attached to an inner surface of the vehicle fuselage in such a manner that, when the pressure bulkhead system is installed in the vehicle, the flange section extends along the inner surface of the vehicle fuselage in the direction of the pressurized cabin space of the vehicle.

A flexible section of the peripheral pressure frame interconnects the attachment section and the flange section and is flexible to accommodate cabin pressure acting on the pressure bulkhead. The flange section may have a Young's modulus that is typical for carbon fiber reinforced composites and that depends on parameters of the semi-finished product and the layer structure. The desired flexibility is achieved mainly due to the geometrical design of the flange section.

Thus, the pressure bulkhead system is designed in such a manner that the peripheral pressure frame, when the pressure bulkhead system is installed in the vehicle, is capable of deforming to a certain extent in response to a cabin pressure load acting on the pressure bulkhead and to thus reduce the stresses acting on the peripheral pressure frame and, in particular, to a connection of the peripheral pressure frame to the vehicle fuselage. As a result, a particularly reliable, but still lightweight connection between the pressure bulkheads and the vehicle fuselage can be established.

The flexible section may incorporate, when viewed in axial cross-section through the pressure bulkhead system, at least one curve.

In different embodiments of the invention, the number of curves may vary. In one embodiment of the pressure bulkhead system, the flexible section incorporates, when viewed in axial cross-section through the pressure bulkhead system, a single curve.

Alternatively, the flexible section may incorporate, when viewed in axial cross-section through the pressure bulkhead system, multiple curves, each separated by a straight.

For example, the flexible section may incorporate, when viewed in axial cross-section through the pressure bulkhead system, two curves separated by one straight, three curves separated by two straights and so on. The provision of the curved portions in the ring frame leads to a reduction of stresses due to cabin pressure compared with the prior art design of, for example, U.S. Pat. No. 8,596,578 B2. In particular, incorporation of a curved junction reduces the risk of separation of the attachment of the peripheral pressure frame where it is connected to the pressure bulkhead or the vehicle fuselage.

The peripheral pressure frame may be formed separate from the pressure bulkhead. It is, however, also conceivable that the peripheral pressure frame is formed integral with the pressure bulkhead.

The pressure bulkhead may be made of a composite material based on a polymer matrix reinforced with fibers. Alternatively or additionally thereto, the peripheral pressure frame may be made of a composite material based on a polymer matrix reinforced with fibers. Making the peripheral pressure frame of composite when the pressure bulkhead is also made of composite is beneficial, because then there is a materials match which eliminates the scope for problems with differential thermal expansion between the peripheral pressure frame and the pressure bulkhead. Providing a pressure bulkhead and/or a peripheral pressure frame made of carbon-fiber reinforced polymer is further advantageous compared with an equivalent metal part, since carbon-fiber reinforced polymer is not associated with fatigue problems. In any case, any differential thermal expansion between the pressure bulkhead and the vehicle fuselage can be accommodated by the peripheral pressure frame's flexible profile, in the same way as cabin pressure is accommodated, thereby avoiding thermally induced stresses.

Basically, the pressure bulkhead may be dome-shaped. Preferably, however, the pressure bulkhead has the shape of a substantially flat disc, where this shape in particular may be realized in a composite material based on a polymer matrix reinforced with fibers.

The pressure bulkhead system may further comprise an intermediary ring plate which is connected to the flange section of the peripheral pressure frame. The intermediary ring plate may be adapted to be arranged radially inside the fuselage of the vehicle in order to close a gap provided between a first fuselage section and a second fuselage section. Thus, the peripheral pressure frame may be attachable to the fuselage of the vehicle via the intermediary ring plate.

A vehicle comprises a pressurized cabin space, an unpressurized cabin space and a pressure bulkhead which is connected to a fuselage of the vehicle in order to separate the pressurized cabin space of the vehicle from the unpressurized cabin space of the vehicle. A peripheral pressure frame is provided for sealingly connecting the pressure bulkhead to the fuselage of the vehicle. The peripheral pressure frame comprises an attachment section which is sealingly attached to an outer rim portion of a first surface of the pressure bulkhead. The first surface faces the unpressurized cabin space of the vehicle. The peripheral pressure frame further comprises a flange section which is adapted to be sealingly attached to an inner surface of the vehicle fuselage and which extends in a direction facing away from the first surface of the pressure bulkhead. Hence, the flange section of the peripheral pressure frame extends in the direction of the pressurized cabin space of the vehicle. Finally, a flexible section of the peripheral pressure frame interconnects the attachment section and the flange section. The flexible section is flexible to accommodate cabin pressure acting on the pressure bulkhead.

The pressure bulkhead and the peripheral pressure frame may be designed as described above.

The fuselage of the vehicle may be made of a composite material based on a polymer matrix reinforced with fibers. Additionally thereto, also the pressure bulkhead and/or the peripheral pressure frame may be made of a composite material. Making the peripheral pressure frame of composite when the fuselage is also made of composite is beneficial, because then there is a materials match which eliminates the scope for problems with differential thermal expansion between fuselage and the ring frame, and also the pressure bulkhead, when the latter is also made of composite.

In certain embodiments, the peripheral pressure frame is connected to the pressure bulkhead and to the fuselage of the vehicle at least in part by fastener connections, e.g., rivets.

The flange section of the peripheral pressure frame may be connected to the fuselage of the vehicle by a plurality of stringers extending parallel to a longitudinal axis of the fuselage and associated first end couplings. The first end couplings are preferably arranged in the pressurized cabin space of the vehicle.

Furthermore, an intermediary ring plate which is connected to the flange section of the peripheral pressure frame and which is arranged radially inside the fuselage of the vehicle such that the peripheral pressure frame is attached to the fuselage of the vehicle via the intermediary ring plate may be connected to the fuselage of the vehicle by a plurality of stringers extending parallel to the longitudinal axis of the fuselage and associated second end couplings. The second end couplings are preferably arranged in the unpressurized cabin space of the vehicle.

The vehicle may be an aircraft.

In a method for installing a pressure bulkhead system as described above in a vehicle, a vehicle fuselage having a first fuselage section and a second fuselage section, which are spaced apart from one another by a gap, is provided. The pressure bulkhead system is attached to the fuselage by sealingly attaching the flange section of the peripheral pressure frame to either the first fuselage section or the second fuselage section.

BRIEF DESCRIPTION OF THE DRAWINGS

Preferred embodiments of the invention will further be described by way of example only with reference to exemplary embodiments illustrated in the figures.

FIG. 1A is a schematic cross-section of a rear pressure bulkhead system according to a first embodiment which is sealingly attached to a first fuselage section of an aircraft fuselage.

FIG. 1B is a schematic perspective view of the same structure as FIG. 1A.

FIG. 1C is a schematic cross-section of the pressure bulkhead system according to FIG. 1A which is installed in an aircraft.

FIG. 2 is a schematic cross-section of a rear pressure bulkhead system according to the first embodiment which is sealingly attached to a second fuselage section of an aircraft fuselage.

DETAILED DESCRIPTION OF THE PREFERRED EMBODIMENTS

Figure 3:
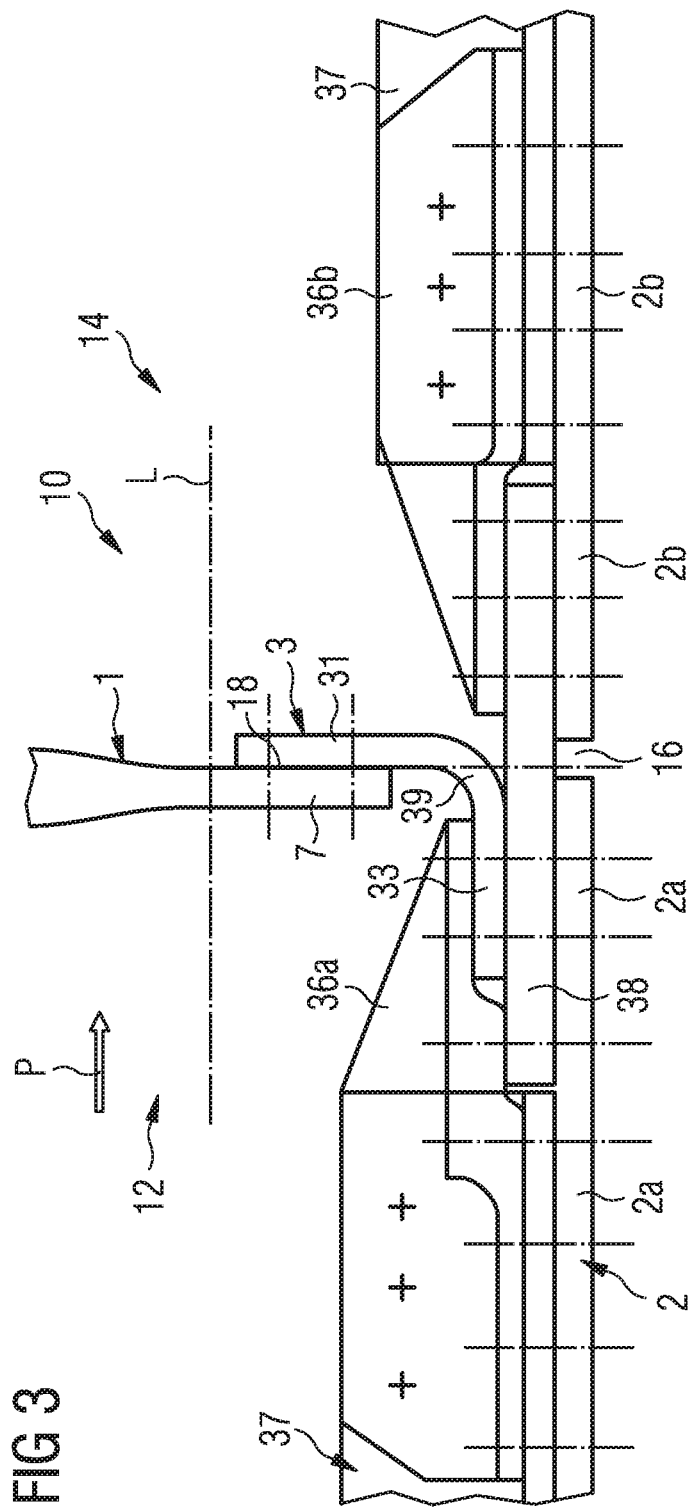
FIG. 3 is a schematic cross-sectional drawing of a rear pressure bulkhead system according to a second embodiment.

FIG. 1A is a schematic cross-sectional drawing of a rear pressure bulkhead system 10 according to a first embodiment. FIG. 1B is a schematic perspective view of the same structure. In FIG. 1B, not all of the reference numerals of FIG. 1A are reproduced to avoid cluttering. FIG. 1C is a schematic cross-section of the whole bulkhead system 10 of the first embodiment which is included to show the overall shape of the bulkhead system 10.

The first embodiment of the pressure bulkhead system 10 is now described with reference to FIGS. 1A, 1B and 1C.

The direction of action of cabin overpressure is indicated schematically by the arrow 'P.' The terms "axial(ly)" and "radial(ly)" make reference to the substantially cylindrical shape of a conventional fuselage, and "outward(ly)" and "inward(ly)" to directions along a radius of the cylinder respectively away from and towards the central axis of the cylinder.

In a first embodiment, a pressure bulkhead system 10 as depicted in FIGS. 1A, 1B and 1C as well as in FIG. 2 comprises a pressure bulkhead 1 which is adapted to be connected to a fuselage 2 of a vehicle, in particular an aircraft, in order to separate a pressurized cabin space 12 of the vehicle from an unpressurized cabin space 14 of the vehicle. In the figures, rear or aft pressure bulkhead 1 is shown. The pressure bulkhead 1 is substantially flat and made of a carbon fiber-reinforced polymer, so has the approximate shape of a flat disc, albeit one that is thicker in the center and whose thickness tapers radially outwards as shown in FIG. 1C. The vehicle fuselage 2 comprises a first section 2a and a second section 2b, the first section 2a and the second section 2b being spaced apart from one another by an air gap 16. The fuselage 2 is made of carbon fiber-reinforced polymer.

The pressure bulkhead 1 is sealingly connected to the vehicle fuselage 2 via a peripheral pressure frame 3. The peripheral pressure frame 3 is made of carbon fiber-reinforced polymer and forms a pressure seal with the fuselage 2 so that the pressure bulkhead 1 can perform its function of bounding the pressurized cabin 12 towards the unpressurized cabin space 14 in the rear of the aircraft. In the embodiments of a pressure bulkhead system 10 depicted in the drawings, the peripheral pressure frame 3 is formed separate from the pressure bulkhead 1. It is, however, also conceivable to provide the pressure bulkhead system 10 with a peripheral pressure frame 3 that is formed integral with the pressure bulkhead 1.

The peripheral pressure frame 3 has an attachment section 31, which is sealingly attached to an outer rim portion 7 of a first surface 18 of the pressure bulkhead 1. The first surface 18 of the pressure bulkhead 1 faces the unpressurized cabin space 14 in the rear of the aircraft. In the first embodiment of the pressure bulkhead system 10 shown in the drawings, the attachment section 31 of the peripheral pressure frame 3 is substantially ring-shaped and overlaps the entire outer rim portion 7 of the pressure bulkhead 1.

The peripheral pressure frame 3 further has a flange section 33, which extends substantially parallel to a longitudinal axis L of the vehicle fuselage 2 and which has the purpose of attaching the peripheral pressure frame 3 to the fuselage 2. In particular, the peripheral pressure frame 3 is shaped in such a manner that the flange section 33 extends in a direction facing away from the first surface 18 of the pressure bulkhead 1, i.e., in the direction of the pressurized cabin space 12 provided in the fuselage 2. The attachment section 31 and the flange section 33 are interconnected by means of a flexible section 34, 32, 35 which is flexible to accommodate cabin pressure acting on the pressure bulkhead 1.

In the arrangement shown in FIGS. 1A, 1B and 1C as well as in FIG. 2, the flexible section 34, 32, 35 has an angled planar section 32 which interconnects the attachment section 31 and the flange section 33 via respective curved junctions 34 and 35 having respective degrees of curvature. The curved junctions 34, 35 may have a generally arcuate shape as depicted and possess respective radii of curvature. Non-arcuate curvature would also be possible. The curved junctions 34 and 35 and the angled planar section 32 thus collectively form a flexible section 34, 32, 35 which, when viewed in axial cross-section through the pressure bulkhead system 10, incorporates two curves, namely curved junctions 34 and 35. There are thus two curves 34 and 35 separated by one straight 32. Since the flexible section 34, 32, 35 extends axially from the radially extending attachment section 31 substantially only towards the pressurized cabin space 12, i.e., in the leftward direction when viewing the Figures, the flexible section 34, 32, 35 has a one-sided, L-shaped construction, rather than a two-sided, T-shaped construction as in the prior art peripheral pressure frame known from U.S. Pat. No. 8,596,578 B1.

The role of the curved junctions 34, 35 is to make the peripheral pressure frame 3 flexible and thus be able to accommodate cabin overpressure in the pressurized cabin space 12 and variations thereof. The peripheral pressure frame 3 may be connected to the pressure bulkhead 1 and to the fuselage 2 at least in parts by fastener connections. For example, riveting may be used for the attachment of the peripheral pressure frame 3 to both the bulkhead 1 and to the fuselage 2. The first embodiment provides a peripheral pressure frame profile with two curved junctions 34, 35 each achieving a 45° bend in total which provides a low risk of separation of the attachment of the peripheral pressure frame 3 where it is connected to the pressure bulkhead 1 and to the fuselage 2.

The attachment of the peripheral pressure frame 3 to the fuselage 2 is now described in more detail. The flange section 33 is shown as attached to the fuselage 2 via an intermediary ring plate 38, which is arranged radially inside the fuselage 2 so as to cover the gap 16 provided between the first and the second fuselage section 2a, 2b. In the arrangement depicted in FIGS. 1A to 1C, the peripheral pressure frame 3, via the flange section 33 and the intermediary ring plate 38 is connected to the first, i.e., a forward fuselage section 2a which in turn is connected to the second, i.e., an aft fuselage section 2b via the intermediate ring plate 38.

Referring to FIG. 1B especially, a stringer 37 is shown which serves to provide a securing point for a first end coupling 36a which extends over, i.e., radially inside, the flange section 33, so that rivets can pass through the first end coupling 36a, flange section 33, intermediary ring plate 38 and first fuselage section 2a in order to form a secure and well sealing attachment. Although not visible, it will be appreciated that the first end couplings 36a have a horizontally extending flange portion which sits flat on the fuselage 2 (similar to the flange portion of the stringer 37 visible on the left of FIG. 1B at the point where the lead line from reference numeral 37 comes closest to the illustration). Furthermore, the stringer 37 also serves to provide a securing point for a second end coupling 36b which extends over, i.e., radially inside, the intermediary ring plate 38, so that rivets can pass through the second end coupling 36b, intermediary ring plate 38 and the second fuselage section 2b. Also the second end coupling 36b may have a horizontally extending flange portion which sits flat on the fuselage 2. Around the whole fuselage 2, there will be an appropriate number of stringers 37 and associated first and second stringer end couplings 36a, 36b, perhaps one every 10 to 20 degrees, i.e. perhaps 20 to 40 in total. The number may depend on the specification of the aircraft and the diameter of the fuselage 2.

Upon installing the pressure bulkhead system 10 depicted in FIGS. 1A to 1C in an aircraft, the flange section 33 of the peripheral pressure frame 3 is attached to the first fuselage section 2a as described above. Thereafter, the second fuselage section 2b is connected to the assembly comprising the first fuselage section 2a and the peripheral pressure frame 3.

The arrangement depicted in FIG. 2 differs from the system according to FIGS. 1A to 1C only in that the peripheral pressure frame 3, via the flange section 33 and the intermediary ring plate 38, is connected to both the first, i.e., the forward fuselage section 2a and the second, i.e., the aft fuselage section 2b. Upon installing the pressure bulkhead system 10 depicted in FIG. 2 in an aircraft, the flange section 33 of the peripheral pressure frame 3 is attached to the second fuselage section 2b as described above. Thereafter, the first fuselage section 2a is connected to the assembly comprising the second fuselage section 2b and the peripheral pressure frame 3. An additional connection between the first fuselage section 2a and the peripheral pressure frame 3 is established by riveting.

FIG. 3 is a schematic cross-sectional drawing of a pressure bulkhead system 10 according to a second embodiment. The peripheral pressure frame 3 is made of carbon fiber-reinforced polymer as in the first embodiment. The second embodiment differs from the first embodiment in the design of the peripheral pressure frame 3. Namely, the peripheral pressure frame 3 has a single curved junction 39 which interconnects the attachment section 31 with the flange section 33. In other words, in the second embodiment, there is no feature corresponding to the angled planar section 32 of the first embodiment. The curved junction 39 may have a generally arcuate shape as depicted and possess a particular radius of curvature. Non-arcuate curvature would also be possible. The curved junction 39 thus forms a flexible section which, when viewed in axial cross-section through the fuselage 2, incorporates a single curve, namely curved junction 39. The flexible section extends axially from the radially extending attachment section 31 substantially only towards the pressurized cabin space 12, i.e., in the leftward direction when viewing the figure. The peripheral pressure frame 3 therefore has a one-sided, L-shaped construction, rather than a two-sided, T-shaped construction as in the prior art peripheral pressure frame. The second embodiment provides a peripheral pressure frame profile with a single curved junction which provides a low risk of separation of the attachment of the peripheral pressure frame 3 where it is connected to the pressure bulkhead 1 or the fuselage 2 compared with having an abrupt 90-degree angle in the peripheral pressure frame profile.

Otherwise, the pressure bulkhead system 10 depicted in FIG. 3 corresponds to the arrangement according to FIGS. 1A to 1C. Furthermore, the pressure bulkhead system 10 according to FIG. 3 is attached to the fuselage 2 as described above in connection with FIGS. 1A to 1C.

In the above embodiments, the peripheral pressure frame 3 can be manufactured using, for example: a tape laying process, resin transfer molding or vacuum infusion.

It will be understood that, although the illustrated embodiments relate to a rear bulkhead system 10, the same design can be adopted for a forward bulkhead system.

It will be understood that although the figures showing the first and second embodiments show a non-tapering section of the fuselage 2, the pressure bulkhead 1 may be fitted at a tapering fuselage section.

The specific embodiments refer to carbon-fiber reinforced polymer. Other composite materials made of a polymer matrix reinforced with fibers which are suitable for aerospace use may also be employed. Additionally, polymer is sometimes referred to as plastic in the art as a synonym. Alternative fiber materials are glass, aramid and basalt. Example polymers are epoxy, vinylester or polyester thermosetting plastic.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure bulkhead system comprising:
a pressure bulkhead adapted to be connected to a fuselage of a vehicle to separate a pressurized cabin space of the vehicle from an unpressurized cabin space of the vehicle; and
a peripheral pressure frame configured to sealingly connect the pressure bulkhead to the fuselage of the vehicle, the peripheral pressure frame comprising:
an attachment section sealingly attached to an outer rim portion of a first surface of the pressure bulkhead, wherein the first surface, when the pressure bulkhead system is installed in the vehicle, faces the unpressurized cabin space of the vehicle, the attachment section having an attachment surface joined to the first surface of the bulkhead;

a flange section configured to be sealingly attached to an inner surface of the vehicle fuselage and which extends in a direction facing away from the first surface of the pressure bulkhead, having a flange surface joined to the inner surface of the vehicle fuselage wherein the flange surface and the attachment surface are on opposite sides of the peripheral pressure frame; and a flexible section interconnecting the attachment section and the flange section and which is flexible to accommodate cabin pressure acting on the pressure bulkhead, wherein the flexible section incorporates, when viewed in axial cross-section through the pressure bulkhead system, multiple curves, each separated by a straight.

2. The pressure bulkhead system of claim 1, wherein the flexible section incorporates, when viewed in axial cross-section through the pressure bulkhead system, two curves separated by one straight.

3. The pressure bulkhead system of claim 1, wherein the peripheral pressure frame is formed separate from the pressure bulkhead or wherein the peripheral pressure frame is formed integral with the pressure bulkhead.

4. The pressure bulkhead system of claim 1, wherein at least one of the peripheral pressure frame and the pressure bulkhead is made of a composite material based on a polymer matrix reinforced with fibers.

5. The pressure bulkhead system of claim 1, wherein the pressure bulkhead has the shape of a substantially flat disc.

6. The pressure bulkhead system of claim 1, further comprising an intermediary ring plate connected to the flange section of the peripheral pressure frame and being configured to be arranged radially inside the fuselage of the vehicle to close a gap provided between a first fuselage section and a second fuselage section such that the peripheral pressure frame is attachable to the fuselage of the vehicle via the intermediary ring plate.

7. A method for installing a pressure bulkhead system according to claim 1 in a vehicle, the method comprising:
providing a vehicle fuselage having a first fuselage section and a second fuselage section which are spaced apart from one another by a gap;
attaching the pressure bulkhead system to the fuselage by sealingly attaching the flange section of the peripheral pressure frame to either the first fuselage section or the second fuselage section.

8. The pressure bulkhead system of claim 1, wherein the peripheral frame is substantially ring-shaped and, in a circumferential direction of the pressure bulkhead, extends along the entire outer rim portion of the first surface of the pressure bulkhead.

9. A vehicle comprising:
a pressurized cabin space;
an unpressurized cabin space;
a pressure bulkhead connected to a fuselage of the vehicle to separate the pressurized cabin space of the vehicle from the unpressurized cabin space of the vehicle; and
a peripheral pressure frame configured to sealingly connect the pressure bulkhead to the fuselage of the vehicle, the peripheral pressure frame comprising:
an attachment section sealingly attached to an outer rim portion of a first surface of the pressure bulkhead, wherein the first surface faces the unpressurized cabin space of the vehicle, the attachment section having an attachment surface joined to the first surface of the bulkhead;
a flange section sealingly attached to an inner surface of the vehicle fuselage and extending in a direction facing away from the first surface of the pressure bulkhead, having a flange surface joined to the inner surface of the vehicle fuselage wherein the flange surface and the attachment surface are on opposite sides of the peripheral pressure frame; and
a flexible section interconnecting the attachment section and the flange section and being flexible to accommodate cabin pressure acting on the pressure bulkhead, wherein the flexible section incorporates, when viewed in axial cross-section through the pressure bulkhead system, multiple curves, each separated by a straight.

10. The vehicle of claim 9, wherein the fuselage of the vehicle is made of a composite material based on a polymer matrix reinforced with fibers.

11. The vehicle of claim 9, wherein the peripheral pressure frame is connected to the pressure bulkhead and to the fuselage of the vehicle at least in part by fastener connections.

12. The vehicle of claim 9, wherein the flange section of the peripheral pressure frame is connected to the fuselage of the vehicle by a plurality of stringers extending parallel to a longitudinal axis of the fuselage and associated first end couplings arranged in the pressurized cabin space of the vehicle.

13. The vehicle of claim 9, wherein an intermediary ring plate is connected to the flange section of the peripheral pressure frame and is arranged radially inside the fuselage of the vehicle such that the peripheral pressure frame is attached to the fuselage of the vehicle via the intermediary ring plate which is connected to the fuselage of the vehicle by a plurality of stringers extending parallel to a longitudinal axis of the fuselage and associated second end couplings arranged in the unpressurized cabin space of the vehicle.

14. The vehicle of claim 9, wherein the peripheral frame is substantially ring-shaped and, in a circumferential direction of the pressure bulkhead, extends along the entire outer rim portion of the first surface of the pressure bulkhead.

* * * * *